United States Patent [19]
Page

[11] Patent Number: 6,116,652
[45] Date of Patent: Sep. 12, 2000

[54] LEARNING MATERIALS DELIVERY SYSTEM

[75] Inventor: Jeanne M. Page, Towson, Md.

[73] Assignee: The Link to Learning LLC, Towson, Md.

[21] Appl. No.: 09/444,872

[22] Filed: Nov. 22, 1999

[51] Int. Cl.[7] .................................................. G09B 11/00
[52] U.S. Cl. ................................ 283/45; 281/29; 281/16; 281/36; 434/430
[58] Field of Search ................................ 283/36–42, 45, 283/46, 63.1, 117; 434/365, 156, 430, 219; 281/16, 29, 31, 38, 51; 402/70, 73

[56] References Cited

U.S. PATENT DOCUMENTS

| | | |
|---|---|---|
| 812,197 | 2/1906 | Fuller . |
| 1,305,939 | 6/1919 | Schmidt . |
| 1,524,647 | 2/1925 | Albrecht . |
| 1,932,935 | 10/1933 | Hubbard . |
| 3,658,365 | 4/1972 | Greubel . |
| 3,839,809 | 10/1974 | Casas et al. . |
| 3,871,115 | 3/1975 | Glass et al. ................................ 283/46 |
| 3,937,493 | 2/1976 | Fasbender . |
| 4,575,126 | 3/1986 | Grubbs . |
| 4,734,036 | 3/1988 | Kasha ................................ 283/46 X |
| 5,358,280 | 10/1994 | Scales . |
| 5,580,254 | 12/1996 | Ramsey . |
| 5,590,911 | 1/1997 | Wilson . |
| 5,713,739 | 2/1998 | Yu ................................ 283/46 X |
| 5,752,837 | 5/1998 | Palmer . |
| 5,851,117 | 12/1998 | Alsheimer et al. ................................ 434/430 X |
| 5,887,905 | 3/1999 | Collins . |

*Primary Examiner*—Willmon Fridie, Jr.
*Attorney, Agent, or Firm*—Venable; Michael A. Sartori

[57] ABSTRACT

A learning materials delivery system contains an instruction unit. The instruction unit has a number of instruction sets, and each instruction set corresponds to a lesson in the instruction unit on an instruction subject. Each instruction set bears indicia corresponding to the instruction subject and includes a first instruction document, a second instruction document, and optionally one or more resource documents. The documents include information relating to the instruction unit and the instruction sets.

27 Claims, 10 Drawing Sheets

THE MOON: LANGUAGE
*The Moon & Mythology*

QUEST: How did people of long ago explain the presence of the moon?

BACKGROUND INFORMATION

Throughout the centuries, the moon has been the subject of many different tales of mythology and folklore. The first calendar was made by following the moon's orbit, and the first month was organized according to the moon's 28 day rotation around the earth.

In Greek and Roman mythology, the goddess Diana was considered the goddess of the moon and the hunt. She was the twin sister of the god Apollo. Her father was Jupiter.

The moon is not really made of cheese as people suspected in the early years. Some people think that the face of the moon resembles that of a human one, so people sometimes say that there is, "a man in the moon".

There are myths and legends from every country telling about the moon. One familiar legend involving the moon is that of the werewolf. People believed that men were bewitched by the power of the full moon and turned into a wolf at the sight of the full moon. This is not true.

FIG. 7A

31B 35   36
37 — THE MOON: LANGUAGE
*The Moon & Mythology*

38 — QUEST: How did people of long ago explain the presence of the moon?

45 — INTRODUCTION: Using the K-W-L chart, have children tell you everything they know about the moon. Have them tell you the titles of stories (werewolves), songs, and nursery rhymes (Hey, Diddle, Diddle) that have the moon in them.

46 — LESSON: Remind children about how people long ago explained the seasons. (Demeter and Persephone) Talk with the children about the different legends and stories surrounding the moon. Ask them if they know of any. Explain that the moon has been a popular figure in our culture since the earliest times. Then have them tell you what they want to learn about the moon and fill in the "W" section of the chart.

47 — READING FOR LITERARY EXPERIENCE
Identifying the most important events in the text.

FIG. 8A

THE MOON: LANGUAGE
*The Moon & Mythology*
QUEST: What did people of long ago think the was?

ACTIVITY
- Read the Native American legend about the moon.
- Have the children identify the four major events that happened. *(1. There was no light on earth because Father Sun and Mother Moon lived in a cave. 2. Coyote and Rabbit gathered fleas, had a fight, and the fleas spilled on the ground and on them. 3. They gathered more fleas and dumped them in the cave. 4. Mother Moon could not stand the fleas and flew out of the cave into the sky and Father Sun followed her. They raced around the Earth trying to get rid of the fleas. That is why the Sun follows the Moon across the sky.)*
- Have the children divide a sheet of paper into four sections. In each section have them write one event from the legend. Then have them illustrate each sentence. Use silver glitter in any picture to represent the moon. The children may work together to create their own play about this legend.
- Use sentence strips as decorated headbands to represent the characters in the play.
- End the activity by having each group share the play with the larger group.
- Return to the K-W-L chart and add any new information to the "L" portion of the chart.

READING FOR LITERARY EXPERIENCE
Identifying the most important events in the text.

© 1999 Camelot Learning

FIG. 8B

RESOURCE SHEET #1
The Moon

Why the Sun Follows the Moon:
A California Indian Legend

Father Sun and Mother Moon lived inside the huge hollow rocks of Rock House. Their light did not shine from the sky, so the people and the animals lived in darkness.

Now Coyote, who was always playing tricks, thought it would be great to dump some fleas on Father Sun and Mother Moon. So he began to gather the fleas and place them in bags. On his way to Rock House he met Rabbit. When Coyote bragged about is bags of fleas, Rabbit would not believe him.. They began to argue. Between them, Rabbit and Coyote began to tug on one of the bags. As Rabbit yanked it from Coyote's grasp, the bag opened and the fleas spilled out on the ground. And to this day, Rabbit and Coyote are always scratching fleas.

Rabbit liked the idea of taking the fleas to Rock House. So together they trudged up the peak to Rock House carrying the bag of fleas. As they walked they tried to think of a plan to get the fleas inside the Rock House.

Along the path they found Gopher digging a hole. They decided to include Gopher in their trick. Gopher could dig a hole down through the soil to Rock House. When they reached the top of the peak, Gopher began to dig quietly so Father Sun and Mother Moon would not be alarmed. As soon as Gopher backed out of the hole, Coyote and Rabbit shook the bag of fleas down the opening. Then they plugged up the hole and ran away feeling very pleased with themselves.

The fleas soon covered Father Sun and Mother Moon. When Mother Moon could no longer stand the fleas, she flew out of Rock House and began to circle the Earth. Father Sun followed Mother Moon out of Rock House. They raced around the Earth trying to get rid of those fleas.

That is why, to this day, the sun follows the moon across the sky.

© 1999 Camelot Learning

FIG. 9

36 — LANGUAGE ARTS
37 — *The Moon & Mythology*
38 — How did people of long
ago explain the presence
of the moon?

61 — MATHEMATICS
65 — *The Apollo Missions and
the Lunar Module*
69 — How many men have walked
on the moon?

35 — THE MOON

62 —
66 — GEOGRAPHY
*The Moon & Its
Mountains and Craters*
70 — How have meteors affected
the surface of the moon?

63 —
67 — SOCIAL STUDIES
*Life on the Moon?*
71 — What should I take for a
vacation on the moon?

64 — SCIENCE
68 — *The Moon and its Orbits*
72 — Why does the moon's appearance
change on different nights?

FIG. 10

THE MOON
SUMMARY OF QUESTS

Monday-Language Arts: *"The Moon and Mythology"* -
    Quest: Using the K-W-L chart, children will tell what they already know about the moon. An Indian Legend, "Why the Sun Follows the Moon" will be read. The children are to listen for four major events. They will illustrate the events.
    Project: Using sentence strip headband costumes, they are to act out the legend Tuesday-Math: *"The Apollo Missions and the Lunar Module"* -
    Quest: The K-W-L chart is used again to gain information about what the children know about man's exploration of the moon. Apollo mission cards are to be distributed and a series of questions about the missions is to be asked.
    Project: The project has the children making their own lunar module from egg carton cups and toothpicks.

Wednesday-Geography: *"The Moon and Its Mountains and Craters"* -
    Quest: Children will examine the poster of the moon and locate major craters, plains, and mountains along with landing sites. They will experiment with making craters by dropping various round objects into the salt dough surface and examining the results.
    Project: Using salt dough, they will make their own models of the moon and label the major craters.

Thursday-Social Studies: *"Life on the Moon?"* -
    Quest: On the dry erase board, there will be a listing of ideas of what the children would take with them on a trip to the moon. They will be able to select only five items to put into their paper backpack.
    Project: The children will paint a mural of what the moon will look like as a tourist destination.

Friday-Science: *"The Moon and Its Orbit"* -
    Quest: This activity focuses on the phases of the moon. After acting out the phases of the moon as described on a resource sheet, the children will be asked to put a series of cards in order according to the phases.
    Project: Younger children will cut and paste their own moon sequence. Older children will be given the opportunity to construct a Moon Box.

PREPARATION

1. <u>Apollo Missions</u> - separate the missions by cutting and mounting on construction paper. Cut and mount the picture of the Apollo Mission insignia.
2. <u>Life on the Moon?</u> - Cut into slips the "Moon Information Slip" sheets. Make multiple copies of Resource Sheet #5 - Backpack
3. <u>The Moon and Its Orbit</u> - cut the phases of the moon apart. Make four envelopes that contain the moon phases. Collect shoeboxes. Prepare a model of the Moon Box.

© 1999 Camelot Learning

FIG. 11A

THE MOON

| SUPPLIES NEEDED | POSTERS/RESOURCES | VOCABULARY |
|---|---|---|
| * silver glitter or crayons<br>* sentence strips<br>* construction paper<br>* pencil and paper<br>* small pieces of paper<br>* egg carton cups<br>* toothpicks, glue<br>* foil<br>* patriotic stickers (optional)<br>* black construction paper<br>* checker pieces<br>* an orange<br>* needle and thread<br>* stick<br>* black paint or marker<br>* flashlight<br>* shoeboxes<br>* salt dough ingredients | * K-W-L chart<br>* Resource Sheet #1 - Legend<br>* Resource Sheet #2 - Lunar Module<br>* Resource Sheet #3 - Apollo Missions<br>* Resource Sheet #4 - Moon Facts<br>* Resource Sheet #5 - Backpack<br>* Resource Sheet #6 - Moon Phases<br>* Resource Sheet #7 - Moon Box directions<br>* weather page from the newspaper<br>* moon poster | * lunar<br>* satellite<br>* crater<br>* Apollo<br>* orbit<br>* phases<br>* meteor |

©1999 Camelot Learning

FIG. 11B

THE MOON

TRAINING TIPS

SUMMARY

During this week, the children will dramatize an Indian folk legend about the moon. They will examine the Apollo missions, the feasibility of living on the moon, what causes moon phases and the geographical features of the moon. The children will be applying the skills identifying the main event, measurement of time, making a geographic model and distinguishing between a want and a need. The Quests will give the children an opportunity to apply information that they have already learned and to extend that information.

ADVANCED PREPARATION

Math: Cut the Resource Sheet # 3 into strips. Review the questions on the Lesson card.
Social Studies: Have a model of the backpack which has been cut and mounted.
Science: Construct a moon box.

INSTRUCTIONAL STRATEGY

Distinguishing between a want and a need.
Use if the K-W-L chart

QUESTS
Language Arts
Engage the participants in the use of the K-W-L chart as it pertains to The Moon theme.
Review the idea of the main idea of a story.

Mathematics
Distribute the Apollo slips and demonstrate how the lesson is to be presented.

Geography
Review the activity and the importance of measuring the diameter of the holes created by the dropped objects and the varying heights.

Social Studies
Show your model of the backpack and how it should be assembled. Engage the participants in responding to the first 2 or 3 "Moon Information Slips".

Science
Show the model of the moon box and review what went into constructing it.

©1999 Camelot Learning

FIG. 12

LEARNING MATERIALS DELIVERY SYSTEM

COPYRIGHT NOTICE

Portions of the disclosure of this patent document contain material that is subject to copyright protection. The copyright owner has no objection to the facsimile reproduction by anyone of the patent document or the patent disclosure, as it appears in the U.S. Patent and Trademark Office patent file or records, but otherwise reserves all copyright rights whatsoever.

BACKGROUND OF THE INVENTION

1. Field of the Invention

The invention relates to a system for delivering learning materials to educators in a day care program to be used in teaching various subjects to children.

2. Background of the Invention

In day care centers, whether pre-school or after school, children are ideally taught skills and knowledge in a structured learning environment. To do this over a course of an academic year, an educator in the day care program needs to prepare daily lesson plans for the students. However, the development and planning of well thought out lesson plans are often tedious and time consuming. Further, the development of such lesson plans for new educators is often difficult because of their lack of experience and the need to create interesting and educational lesson plans each day.

In day care programs, the educators teaching the students typically do not have a degree in education and have little training in developing lesson plans. Without formal training in education, many educators in day care programs often find it difficult to develop consistent lesson plans over an academic year.

Further, in a day care program, each lesson with the students ideally has an education goal. However, the alignment of the lessons and the education goals is a difficult task and is especially burdensome over an academic year.

In addition, if day care programs are operated as a chain of day care programs or as franchised day care programs, the manager of the programs typically wants to have a standard learning experience for all the children in each of the day care programs. Such a desired standardized learning experience is difficult to establish across a number of day care programs if the educators are developing the lessons themselves.

To address the need to develop lesson plans in schools, textbooks and accompanying teachers' editions are written and used by teachers in elementary schools, high schools, and colleges. However, such textbooks and accompanying teachers' editions are not typically available for day care programs.

There exists a need for standardized learning materials for day care programs. Further, there exists a need for standardized learning materials for day care programs that can be used by an educator that does not have a degree in education. Additionally, there exists a need for standardized learning materials for day care programs that have an education goal for each lesson plan. Moreover, there exists a need for standardized learning materials to be used by a chain of day care programs or franchised day care programs.

SUMMARY OF THE INVENTION

An object of the invention is to provide standardized learning materials for day care programs.

An object of the invention is to provide standardized learning materials for day care programs that can be used by an educator who does not have a degree in education.

An object of the invention is to provide standardized learning materials for day care programs that have an education goal for each lesson plan.

An object of the invention is to provide standardized learning materials to be used by a chain of day care programs or franchised day care programs.

The invention includes a system and methods for a learning materials delivery system. The system of the invention includes a learning materials delivery system for an instruction unit. The instruction unit has a number of instruction sets, and each instruction set corresponds to a lesson in the instruction unit on an instruction subject. Each instruction set bears indicia corresponding to the instruction subject and includes a first instruction document, a second instruction document, and optionally one or more resource documents. The documents include information relating to the instruction unit and the instruction sets.

The method of the invention includes a method for manufacturing the learning material delivery system of the invention. The method of the invention also includes a method for providing the learning material delivery system to a day care program. The method of the invention further includes a method for teaching students using the learning material delivery system. The method of the invention additionally includes a method for learning using the learning material delivery system.

The above objects and advantages of the invention are illustrative, and not exhaustive, of those which can be achieved by the invention. Thus, these and other objects and advantages of the invention will be apparent from the description herein, both as embodied herein and as modified in view of any variations which will be apparent to those skilled in the art.

BRIEF DESCRIPTION OF THE DRAWINGS

Embodiments of the invention are explained in greater detail by way of the drawings, where the same reference numerals refer the same features.

FIGS. 7A and 7B illustrate a plan view for an example of the front and back, respectively, of a first instruction sheet.

FIGS. 8A and 8B illustrate a plan view for an example of the front and back, respectively, of a second instruction sheet.

FIG. 9 illustrates a plan view for an example of a resource sheet.

FIG. 10 illustrates a plan view for an example of an overview sheet.

FIGS. 11A and 11B illustrate a plan view for an example of the front and back, respectively, of a summary sheet.

FIG. 12 illustrates a plan view for an example of a training tip sheet.

DETAILED DESCRIPTION OF THE INVENTION

The invention includes a learning materials delivery system. The learning materials delivery system is delivered to a day care program, such as a pre-school day care program or an after school day care program for children in elementary school. The learning materials delivery system is delivered to the day care program on a periodic basis, such as on a weekly basis throughout the academic year. The learning material delivery system contains one instruction unit with five instruction sets, one for each day of the work week.

FIGS. 1–6 illustrate plan views of an embodiment of the learning materials delivery system in paper form. For this embodiment, the system is delivered on a weekly basis to a day care program over an academic year.

Figure 1:
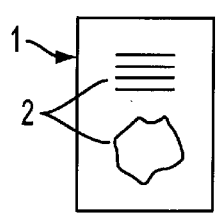
FIG. 1 illustrates a plan view of a first pocket folder in a closed position.

FIG. 1 illustrates a plan view of a first pocket folder 1 in a closed position. The first pocket folder 1 bears indicia 2 of the day care program. The indicia 2 can be, for example, text and a picture related to the day care program and/or the instruction unit of the learning materials delivery system. In the closed position, the first pocket folder is approximately 9" wide by approximately 12" long.

Figure 5:
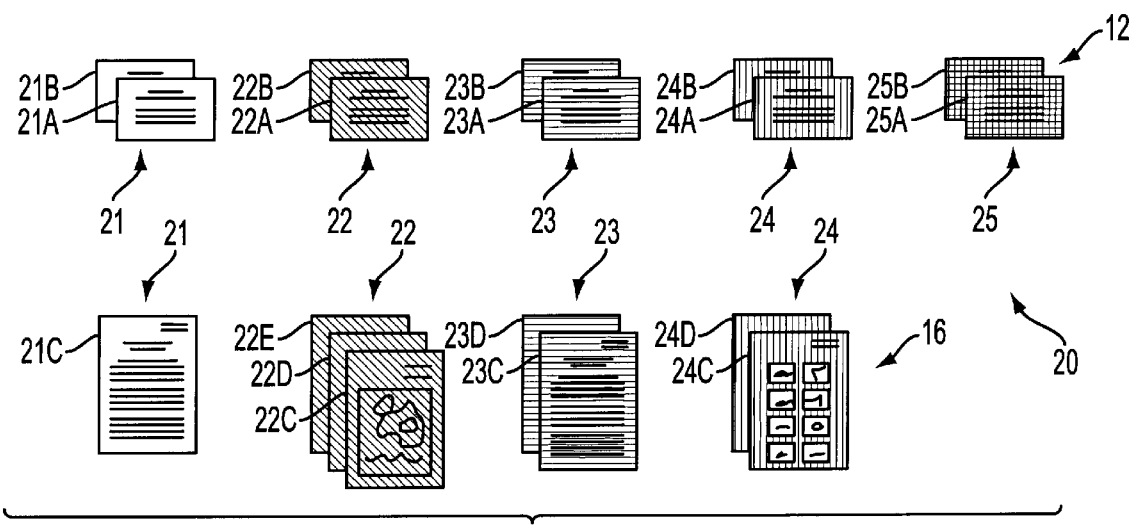
FIG. 5 illustrates a plan view of an instruction unit, including instruction sets, first and second instruction sheets, and resource sheets.

The first pocket folder 1 contains an instruction unit 20, illustrated in FIG. 5, for the day care program, and the instruction unit 20 has one or more instruction sets, and namely five instruction sets 21–25, as illustrated in FIG. 5. Each instruction set corresponds to a different instruction subject. When the next learning materials delivery system is delivered to the day care program, the first pocket folder 1 contains the instruction unit for the next period.

Figure 2:
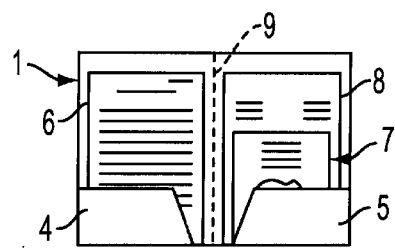
FIG. 2 illustrates a plan view of a first pocket folder in an open position.

FIG. 2 illustrates a plan view of the first pocket folder 1 in an open position. The first pocket folder 1 includes two pockets 4 and 5. The first pocket 4 includes one or more resource sheets 6. The second pocket 5 includes a second pocket folder 7 and a number of instruction units synopsis sheets 8. The first pocket folder folds along fold line 9. In the open position, the first pocket folder 1 is approximately 18" wide by approximately 12" long.

The first pocket 4 is attached to the first pocket folder 1 along the left side and the bottom of the first pocket folder 1. The resource sheets 6 are removably held in place by the first pocket 4. The second pocket 5 is attached to the first pocket folder 1 along the right side and the bottom of the first pocket folder 1. The second pocket folder 7 and the instruction unit synopsis sheets 8 are removably held in place by the second pocket 5.

Figure 3:
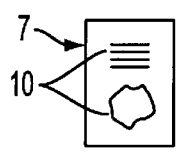
FIG. 3 illustrates a plan view of a second pocket folder in a closed position.

FIG. 3 illustrates a plan view of the second pocket folder 7 in a closed position. The second pocket folder 7 bears indicia 10 of the day care program. The indicia 10 can be, for example, text and a picture related to the day care program and/or the instruction unit. In the closed position, the second pocket folder 7 is approximately 6" wide by approximately 9" long.

Figure 4:
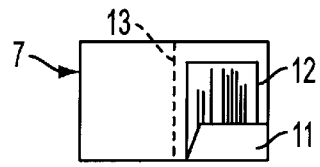
FIG. 4 illustrates a plan view of a second pocket folder in an open position.

FIG. 4 illustrates a plan view of the second pocket folder in an open position. The second pocket folder 7 includes a pocket 11. The pocket 11 is attached to the second pocket folder 7 along the right side and bottom of the second pocket folder 7. The second pocket folder 7 includes first and second instruction sheets 12, and the first and second instruction sheets 12 are held in place by the pocket 11. The second pocket folder 7 folds along fold line 13. In the open position, the second pocket folder 7 is approximately 12" wide by approximately 9" long.

FIG. 5 illustrates a plan view of an instruction unit 20, including instruction sets 21–25, first and second instruction sheets 12, and resource sheets 6. The first and second instruction sheets are generally identified by reference numeral 12 and are individually identified by reference numerals 21A, 21B, 22A, 22B, 23A, 23B, 24A, 24B, 25A, and 25B. The resource sheets are generally identified by reference numeral 6 and are individually identified by reference numerals 21C, 22C, 22D, 22E, 23C, 23D, 24C, and 24D.

The instruction unit 20 includes five instruction sets 21–25. Each instruction set includes a first instruction sheet, a second instruction sheet, and optionally one or more resource sheets. For the instruction unit 20, the first instruction set 21 includes a first instruction sheet 21A, a second instruction sheet 21B, and one resource sheet 21C. The second instruction set 22 includes a first instruction sheet 22A, a second instruction sheet 22B, and three resource sheets 22C, 22D, and 22E. The third instruction set 23 includes a first instruction sheet 23A, a second instruction sheet 23B, and two resource sheets 23C and 23D. The fourth instruction set 24 includes a first instruction sheet 24A, a second instruction sheet 24B, and two resource sheets 24C and 24D. The fifth instruction set 25 includes a first instruction sheet 25A and a second instruction sheet 25B, but no resource sheets.

Each instruction set 21–25 in the instruction unit 20 is identified by a different indicia, such as color, a symbol, text, or a number. In FIG. 5, the instruction sets are identified using colored sheets of paper and text. Further, because each instruction set uniquely corresponds to an instruction subject, the colors and text also identify the instruction subject of the instruction set. For instance, the first instruction set 21 may be for the instruction subject of language arts and may be identified by white sheets of paper. The second instruction set 22 may be for the instruction subject mathematics and may be identified by green sheets of paper. The third instruction set 23 may be for the instruction subject social studies and may be identified by blue sheets of paper. The fourth instruction set 24 may be for the instruction subject geography and may be identified by pink sheets of paper. The fifth instruction set 25 may be for the instruction subject science and may be identified by yellow sheets of paper.

Each of the first and second instruction sheets 12 is approximately 8.5" wide by approximately 5.5" long. The first and second instruction sheets 12 are delivered within the second pocket folder 7. The first and second instruction sheets 12 are contained in the second pocket folder 7 and are removably held in place by the pocket 11. The first and second instruction sheets 12 are delivered in the second pocket folder 7 to keep them in order.

In addition to bearing indicia corresponding to the instruction subject, each first instruction sheet 21A, 22A, 23A, 24A, and 25A includes information printed thereon corresponding to the instruction subject of the instruction set and the instruction unit. For instance, each first instruction sheet includes student learning objective information, lesson background information, and lesson material information. The student learning objective information includes a question identifying the lesson of the instruction set. This question is known as a "quest" for the instruction set. The lesson background information includes background information for the lesson of the instruction set. The lesson material information includes a list of materials needed to perform an activity described in the lesson activity information of the corresponding second instruction sheet in the instruction set.

Further, the lesson material information lists any resource sheets to be used with the instruction set.

In addition to bearing indicia corresponding to the instruction subject of the instruction set, each second instruction sheet 21B, 22B, 23B, 24B, and 25B includes information printed thereon corresponding to the instruction subject of the instruction set and the instruction unit. For instance, each second instruction sheet includes student learning objective information, lesson activity information, and education goal information. The student learning objective information is the same as the student learning objective information of the corresponding first instruction sheet of the instruction set. The lesson activity information includes lesson steps to perform for an activity related to the lesson of the instruction set and references the lesson material information of the corresponding first instruction sheet in the instruction set. The education goal information identifies an education goal, such as one of the National Education Goals. There are 400 National Education Goals, which are determined by the United States Department of Education, National Center for Educational Statistics, and the education goal information can identify one of these goals. Other possible education goals include the Maryland School Performance Assessment Program, which has 110 goals and is determined by the Maryland State Department of Education. The first and second instruction sheets are further discussed below with respect to the example illustrated in FIGS. 7A–8B.

Each of the first and second instruction sheets is laminated because of the heavy use of the instruction sheets while teaching the children in the day care program.

Each resource sheet 6 is approximately 8½" wide by approximately 11" long. The resource sheets 6 are removably held in place by the first pocket 4 in the first pocket folder 1.

Each resource sheet 21C, 22C, 22D, 22E, 23C, 23D, 24C, and 24D has lesson information corresponding to the instruction subject for the instruction set and the instruction unit. The lesson information for each resource sheet is printed on the resource sheet and includes information regarding an activity, a story, and/or a picture corresponding to the lesson of the instruction set. The resource sheets for an instruction set are referenced in the lesson materials information of the corresponding first instruction sheet and are mentioned in the lesson activity information of the corresponding second instruction sheet. The resource sheets are further discussed below with respect to the example illustrated in FIG. 9.

Figure 6:
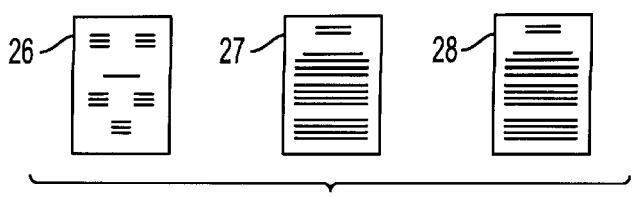
FIG. 6 illustrates a plan view of instruction unit synopsis sheets.

FIG. 6 illustrates a plan view of the instruction unit synopsis sheets 8. The instruction unit includes three instruction unit synopsis sheets 8, namely an overview sheet 26, a synopsis sheet 27, and a training tip sheet 28. The instruction unit synopsis sheets 26–28 are contained in the first pocket folder 1 and are removably held in place by the second pocket 5. Each instruction unit synopsis sheet 26–28 is approximately 8.5" wide by approximately 11" long. The instruction unit synopsis sheets include instruction unit synopsis information corresponding to the instruction unit and the instruction sets of the instruction unit. The instruction unit synopsis sheets are further discussed below with respect to the example illustrated in FIGS. 10–12.

FIGS. 7A–12 illustrate plan views of an example of the embodiment of the invention illustrated in FIGS. 1–6. The example is for an instruction unit having five instruction sets for five lessons on the instruction subject of the moon. Each instruction set corresponds to one of the following instruction subjects: language arts, mathematics, social studies, geography, and science. FIGS. 7A–9 illustrate the example for the instruction set for the instruction subject of language arts. The exemplary instruction set includes a first instruction sheet 31A illustrated in FIGS. 7A and 7B, a second instruction sheet 31B illustrated in FIGS. 8A and 8B, and a resource sheet 31C illustrated in FIG. 9. FIGS. 10–12 illustrate the instruction unit synopsis sheets for the example of the instruction unit. The exemplary instruction unit synopsis sheets include an overview sheet 55 illustrated in FIG. 10, a summary sheet 56 illustrated in FIGS. 13A and 13B, and a training tip sheet 57 illustrated in FIG. 12.

Figure 7B:
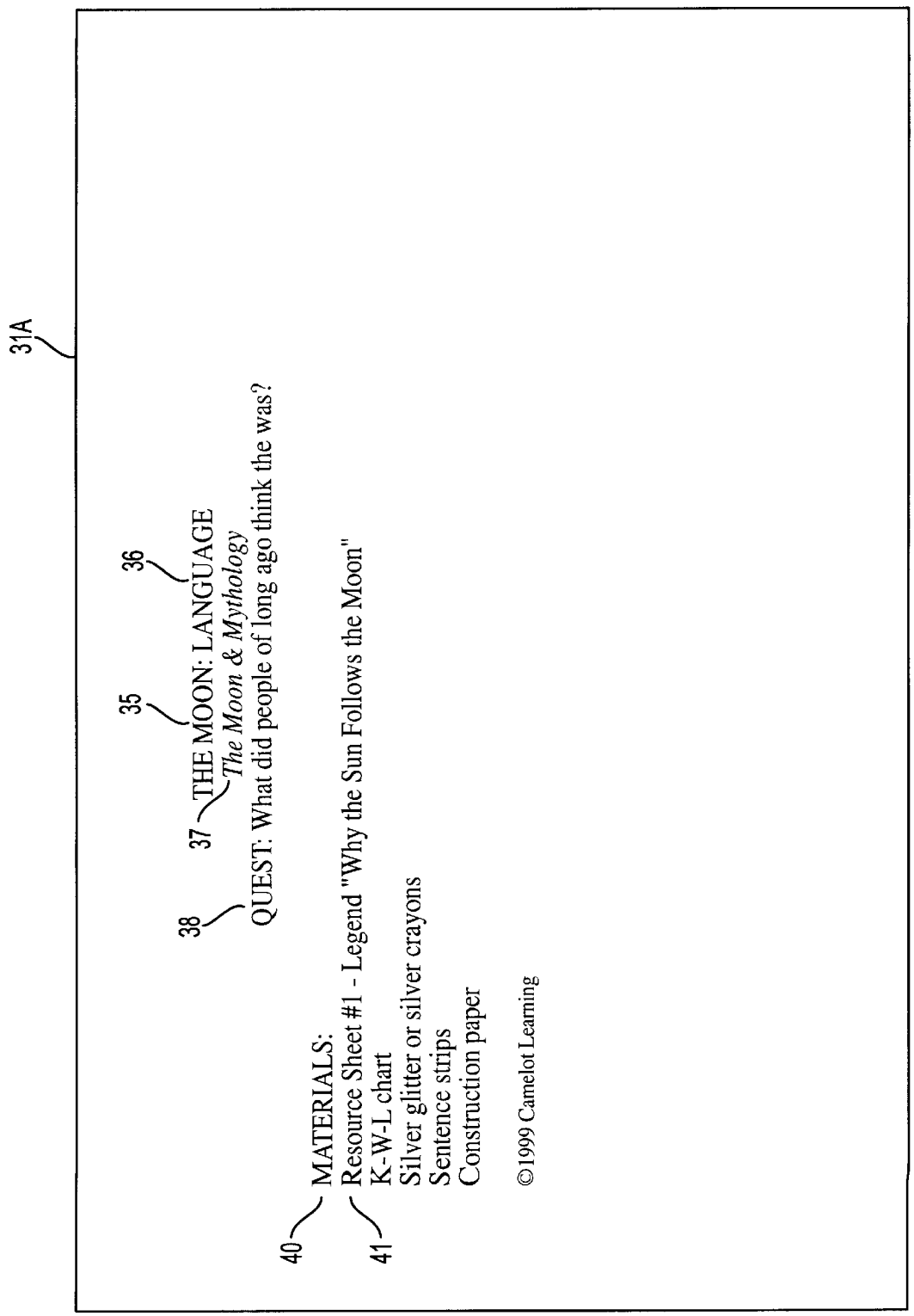

FIGS. 7A and 7B illustrate a plan view for the example of the front and back, respectively, of the first instruction sheet 31A. As illustrated in FIG. 7A, the front of the first instruction sheet 31A includes instruction unit information 35, instruction subject information 36, instruction set information 37, student learning objective information 38, and lesson background information 39.

As illustrated in FIG. 7B, the back of the first instruction sheet 31A includes instruction unit information 35, instruction subject information 36, instruction set information 37, student learning objective information 38, and lesson material information 40. The lesson material information 40 includes a list of materials to be used for the lesson of the instruction set. The lesson material information includes any references to resource sheets used for the lesson of the instruction set. For instance, lesson material information 40 includes a reference 41 to Resource Sheet #1, which is resource sheet 31C illustrated in FIG. 9.

FIGS. 8A and 8B illustrate a plan view for the example of the front and back, respectively, of the second instruction sheet 31B. As illustrated in FIG. 8A, the front of the second instruction sheet 31B includes instruction unit information 35, instruction subject information 36, instruction set information 37, student learning objective information 38, lesson introduction information 45, lesson description information 46, and education goal information 47.

As illustrated in FIG. 8B, the back of the second instruction sheet 31B includes instruction unit information 35, instruction subject information 36, instruction set information 37, student learning objective information 38, lesson activity information 48, and education goal information 47.

FIG. 9 illustrates a plan view of an example of the resource sheet 31 C. The resource sheet 31C includes instruction unit information 35, resource sheet identifier information 51, and lesson information 52.

FIG. 10 illustrates a plan view of an example of the overview sheet 55. The overview sheet 55 provides an overview of the instruction sets for the instruction unit. The overview sheet 55 includes instruction unit information 35, instruction subject information 36 and 61–64, instruction set information 37 and 65–68, and student learning objective information 38 and 69–72. The instruction subject information, the instruction set information, and student learning objective information are arranged for each instruction set on the overview sheet 55. For example, the instruction subject information 36, the instruction set information 37, and the student learning objective information 38 are for the first instruction set and are arranged together.

FIGS. 11A and 11B illustrate a plan view for an example of the front and back, respectively, of the summary sheet 56. The summary sheet 56 summarizes the lessons for the instruction unit. As illustrated in FIG. 11A, the front of the summary sheet 56 includes instruction unit information 35, title information 75, lesson summary information 36, 37, 61–68, and 76–85, and lesson preparation information 86.

The lesson summary information includes instruction subject information 36 and 61–64, instruction set information 37 and 65–68, day information 76–80, and daily lesson summary information 81–85. The lesson summary information is arranged according to the lessons, which are to be presented on a particular day of the week. For instance, the lesson summary information for Monday includes day information 76, instruction subject information 36, instruction set information 37, and daily lesson summary information 81.

As illustrated in FIG. 11B, the back of the summary sheet 56 includes instruction unit information 35 and summary table 91. The summary table 91 includes three columns of information, namely a supplies needed column of information 92, a poster/resources column of information 93, and a vocabulary column of information 94. The supplies needed column of information 92 includes information regarding the supplies needed for teaching the lessons of the instruction unit. The posters/resources column of information 93 includes information regarding the posters and resources needed for the lessons of the instruction unit. The vocabulary column of information 94 includes information regarding the vocabulary words to be learned by the students during the lessons of the instruction unit.

FIG. 12 illustrates a plan view of an example of the training tip sheet 57. The training tip sheet 57 include instruction unit information 35, title information 101, instruction unit summary information 102, instruction unit advanced preparation information 103, instruction unit instructional strategy information 104, and instruction subject training information 105. The instruction subject training information 105 includes training tips for each of the instruction subjects in the instruction unit.

To provide a day care program with the learning material delivery system of the invention, the learning material delivery system, such as the embodiment illustrated in FIGS. 1–6, is assembled and provided to the day care program on a periodic basis. To assemble the learning material delivery system, an instruction unit for one or more instruction sets is manufactured. Each instruction set includes a first instruction sheet, a second instruction sheet, and optionally one or more resource documents. Each first and second instruction sheet is laminated. After being laminated, the first and second instruction sheets 12 for each instruction set are placed in the second pocket folder 7. The second pocket folder 7, the resource documents 6, and the instruction unit synopsis sheets 8 are placed in the first pocket folder 1. The first pocket folder 1 is provided to the day care program. On a periodic basis, additional first pocket folders are assembled for additional instruction units and provided to the day care program.

To teach students using the learning material delivery system, the day care program receives the learning material delivery system on a periodic basis. When the learning material delivery system is received, an educator initially reviews the instruction unit synopsis sheets 8. The educator teaches one lesson a day, and the lesson for the day is determined by one of the instruction sets in the instruction unit. The lesson to be taught for the day is identified by the day information 76–80 of the lesson summary information on the summary sheet. Further, because of the consistent color indicia used to identify the instruction subjects in each instruction unit, the educator knows which instruction set to teach on which day of the week. For instance, the white instruction set is taught on Mondays, the green instruction set is taught on Tuesdays, the blue instruction set is taught on Wednesdays, the pink instruction set is taught on Thursdays, and the yellow instruction set is taught on Fridays.

To prepare for a particular lesson, the educator reviews the first instruction sheet, the second instruction sheet, and any resource sheets of the instruction set. The educator gathers materials for the lesson of the instruction set as identified by the lesson material information of the first instruction sheet. The educator provides the first instruction sheet to the students for review during the lesson. The educator teaches the lesson for the instruction set by following the lesson activity information of the second instruction sheet and using any resource sheets. The first instruction sheet is provided to the students, and the second instruction sheet is not provided to the students because the lesson activity information of the second instruction sheet often contains answers to questions posed in the lesson activity information of the second instruction sheet. In this way, the student learning objective identified by the student learning objective information of the first and second instruction sheets is pursued, and the education goal identified by the education goal information of the second instruction sheet is pursued.

Because of the invention, educators do not need to have a degree in education to teach students in a day care program. By using the learning materials delivery system of the invention, the lessons for each day over an academic year are pre-planned and are made available to the day care program and the educator when needed. The instruction sets of the instruction unit are presented in an easy to understand fashion to enable an educator to teach the students. Further, by listing the materials and the steps in the activities, the educator can easily pursue with the students both the student learning objective identified by the student learning objective information of the first and second instruction sheets and the education goal identified by the education goal information of the second instruction sheet.

The embodiments of the invention illustrated in FIGS. 1–12 are in paper form. In general, the learning material delivery system can be embodied in an information storage device. An information storage device refers to an article of manufacture used to store information. An information storage device can have different forms, for example, paper form or electronic form. In paper form, the information storage device includes paper printed with the information. In electronic form, the information storage device includes a computer-readable medium storing the information as data.

A "computer-readable medium" refers to any storage device used for storing data accessible by a computer. Examples of a computer-readable medium include: a magnetic hard disk; a floppy disk; an optical disk, such as a CD-ROM and a DVD; a magnetic tape; a memory chip; and a carrier wave used to carry computer-readable electronic data, such as those used in transmitting and receiving e-mail or in accessing a network.

A "computer" refers to any apparatus that is capable of accepting a structured input, processing the structured input according to prescribed rules, and producing results of the processing as output. Examples of a computer include: a computer; a general purpose computer;

a supercomputer; a mainframe; a super mini-computer; a mini-computer; a workstation; a micro-computer; a server; an interactive television; and a hybrid combination of a computer and an interactive television. A computer also refers to two or more computers connected together via a network for transmitting or receiving information between the computers. An example of such a computer includes a distributed computer system for processing information via computers linked by a network.

"Software" refers to prescribed rules to operate a computer. Examples of software include: software; code segments; instructions; computer programs; and programmed logic.

A "network" refers to a number of computers and associated devices that are connected by communication facilities. A network involves permanent connections such as cables or temporary connections such as those made through telephone or other communication links. Examples of a network include: an internet, such as the Internet; an internet; a local area network (LAN); a wide area network (WAN); and a combination of networks, such as an internet and an intranet.

In electronic form, the learning material delivery system of the invention can be embodied in a number of ways. For example, a computer-readable medium, such as a CD-ROM or a floppy disk, can be delivered to the day care program on a periodic basis. The day care program accesses the instruction unit stored on the computer-readable medium and prints the information on paper, including colored paper, as appropriate.

As another example of an embodiment of the learning material delivery system of the invention in electronic form, the instruction units can be made available to the day care program on a web site accessible via the Internet. When the next instruction unit is needed, the day care program accesses the web site, downloads the instruction unit, and prints the information for the instruction unit on paper, including colored paper, as appropriate.

Whether embodied in electronic form or paper form, the sheets of the embodiments illustrated in FIGS. 1–12 can be referred to as documents. A document in paper form is referred to as a sheet, and a document in electronic form is referred to as a file. In electronic form, an instruction unit can be embodied in one or more files, or documents, as desired.

The learning materials delivery system of the invention has been described as having color as an indicia for differentiating the instruction sets in the instruction unit. As discussed above, each instruction subject in the instruction unit is identified by different colored paper. As an option, each instruction subject in an instruction unit can be identified by different colored ink, and all the instruction sets are white sheets of paper. For example, for the embodiment discussed above for FIG. 1–6, the instruction set for language arts is printed with black ink on white paper, the instruction set for mathematics is printed with green ink on white paper, the instruction set for social studies is printed with blue ink on white paper, the instruction set for geography is printed with pink ink on white paper, and the instruction set for science is printed with yellow ink on white paper.

The learning materials delivery system of the invention has been described as having five instruction subjects in the instruction unit, namely language arts, mathematics, social studies, geography, and science. As an option, one or more instruction subjects can be contained in the instruction unit. Further, as an option, instruction subjects can differ depending on the skills and knowledge that are to be taught to the students in the day care program.

The learning materials delivery system of the invention has been described as having the instruction unit for the theme of the moon. As an option, other themes for the instruction unit can be used based on the skills and knowledge that are to be taught to the students in the day care program. For instance, if the instruction units are to be delivered to the day care program on a weekly basis over an academic year, the themes for each instruction unit could be as follows: in September, the themes could be Camelot, getting to know you, time management, archaeology, and ancient Egyptians; in October, the themes could be Maya, explorers, Native Americans, harvest, and elections; in November, the themes could be seasons, Veteran's Day, cooking and meal planning, and Thanksgiving; in December, the themes could be the moon, our solar system-exploration, dinosaurs, and starry night; in January, the themes could be the Arctic, Arctic animals, African American heroes, and winter weather systems; in February, the themes could be fantasy, civil war, revolutionary war, and mountain habits; in March, the themes could be alien life, famous women, Ireland, and wetlands; in April, the themes could be cloud formations, exploring careers, plants, caring for the earth, and tropical rain forests; in May, the themes could be birds, farm to table, nutrition, and digestion; and in June, the themes could be exercise and the Chesapeake Bay. Depending on the skills and knowledge to be taught to the students and the length of the academic term, other themes can be used for the instruction units.

The learning materials delivery system of the invention has been described as being delivered to a day care program, such as a pre-school day care program or an after school day care program for children in elementary school. As an option, depending on the students, the learning material system can be delivered to a program other then a day care program, such as an adult learning program, a police athletic league program, or a Jesuit inner city program, which meets after school and on weekends. Further, as an option, based on the lessons of the instruction sets for the instruction units of the learning materials delivery system, the invention can have instruction units for any level of education from pre-school through post-college education and for teaching instruction subjects that are not traditionally taught in schools. Moreover, as an option, instead of delivering the system to a day care program, the system can be delivered to an educator.

The learning materials delivery system of the invention has been described as being provided to a day care program on a weekly basis throughout the academic year. As an option, the learning materials delivery system can be delivered on any periodic basis, such as daily, weekly, monthly, and yearly. Further, each instruction unit has a sufficient number of lesson plans to be used until the next instruction unit is received by the day care program. For example, if the learning materials delivery system is received on a weekly basis, the system has one instruction unit with five instruction sets, one for each day of the work week.

The learning materials delivery system of the invention has been described as including pocket folders 1 and 7 for removably holding the sheets of the instruction unit. As an option, any device for removably holding the sheets of the instruction unit can be used. For example, a pocket folder with one or more packets attached to one, two, or three sides of the pocket folder can be used. In addition, other types of sheet carrying devices can be used instead of pocket folders.

The invention has been described in detail with respect to preferred embodiments, and it will now be apparent from the foregoing to those skilled in the art that changes and modifications may be made without departing from the invention in its broader aspects, and the invention, therefore, as defined in the claims is intended to cover all such changes and modifications as fall within the true spirit of the invention.

What is claimed is:

1. A learning material delivery system for an instruction unit having a plurality of instruction subjects, comprising:
   a plurality of instruction sets for the instruction unit, each instruction set corresponding to a lesson in the instruction unit on an instruction subject, each instruction set bearing indicia corresponding to the instruction subject, each indicia uniquely identifying an instruction subject, each instruction set comprising:
      a first instruction document bearing the indicia corresponding to the instruction subject and having student learning objective information, lesson background information, and lesson material information corresponding to the instruction subject and the instruction unit; and
      a second instruction document bearing the indicia corresponding to the instruction subject and having the student learning objective information and lesson activity information corresponding to the instruction subject and the instruction unit.

2. A system as in claim 1, wherein the indicia corresponding to the instruction subject is at least one of a color, a symbol, text, and a number.

3. A system as in claim 1, wherein the student learning objective information of the first and second instruction documents in each instruction set comprises a question identifying the lesson of the instruction set.

4. A system as in claim 1, wherein the lesson background information of the first instruction document in each instruction set comprises background information for the lesson of the instruction set.

5. A system as in claim 1, wherein the lesson material information of the first instruction document in each instruction set comprises a list of materials needed to perform an activity described in the lesson activity information of the second instruction document in the instruction set, the list of materials listing any resource documents for the instruction set.

6. A system as in claim 1, wherein the lesson activity information of the second instruction document in each instruction set comprises lesson steps to perform an activity related to the lesson of the instruction set and references the lesson material information of the first instruction document in the instruction set.

7. A system as in claim 1, wherein at least one instruction set further comprises at least one resource document, each resource document bearing the indicia corresponding to the instruction subject and having lesson information corresponding to the instruction subject and the instruction unit.

8. A system as in claim 1, wherein the lesson information of each resource document in each instruction set comprises at least one of an activity, a story, and a picture corresponding to the lesson of the instruction set.

9. A system as in claim 1, wherein the second instruction document further comprises education goal information.

10. A system as in claim 9, wherein the education goal information identifies a National Education Goal.

11. A system as in claim 1, wherein the first instruction documents and the second instruction documents are in paper form.

12. A system as in claim 1, wherein the first instruction documents and the second instruction documents are in electronic form.

13. A system as in claim 1, further comprising a second pocket folder to hold the first and second instruction documents of each instruction set in the instruction unit and a first pocket folder to hold the second pocket folder and any resource documents for the instruction sets in the instruction unit.

14. A system as in claim 13, wherein the first and second instruction documents are laminated and are smaller than any resource sheets.

15. A system as in claim 1, wherein the instruction subjects are language arts, mathematics, social studies, geography, and science.

16. A system as in claim 1, further comprising instruction unit synopsis documents.

17. A system as in claim 16, wherein the instruction unit synopsis documents comprise an overview document, a summary document, and a training tip document.

18. A method for manufacturing the learning material delivery system of claim 1, comprising the steps of:
   providing the instruction unit having the plurality of instruction sets, each instruction set comprising the first instruction document, the second instruction document, and zero or more resource documents;
   placing the first and second instruction documents for each instruction set in a second pocket folder; and
   placing the second pocket folder and any resource documents for the instruction sets in a first pocket folder.

19. A method as in claim 18, further comprising the step of laminating the first and second instruction documents.

20. A method as in claim 18, further comprising the step of providing the learning material delivery system on a periodic basis to a program for teaching students.

21. A method comprising the step of providing the learning material delivery system of claim 1 to a program for teaching students.

22. A method of teaching students, comprising the steps of:
   receiving the learning material delivery system of claim 1; and
   teaching the students using the learning material delivery system.

23. A method as in claim 22, further comprising the steps of:
   reviewing the first instruction document, the second instruction document, and any resource documents for an instruction set to teach the lesson of the instruction set;
   gathering materials for the lesson of the instruction set, the materials identified by the lesson material information of the first instruction document of the instruction set;
   providing the first instruction document of the instruction set to the students; and
   teaching the lesson for the instruction set by following the lesson activity information of the second instruction document of the instruction set and using any resource documents of the instruction set, thereby achieving a student learning objective identified by the student learning objective information of the first and second instruction documents of the instruction set.

24. A method as in claim 23, further comprising the step of teaching one lesson a day, the lesson for the day being determined by one of the instructions sets in the instruction unit.

25. A method as in claim 22, wherein the learning material delivery system is received on a periodic basis.

26. A method comprising the step of being taught lessons from the learning material delivery system of claim 1.

27. A learning material delivery system for an instruction unit having a plurality of instruction sets, each instruction set corresponding to an instruction subject, each instruction subject identified by a color, comprising:

a first pocket folder for the instruction unit comprising:
a second pocket folder for the instruction unit comprising:
    a plurality of first instruction sheets, each first instruction sheet being laminated and comprising a colored sheet of paper, the color of each first instruction sheet corresponding to one of the instruction subjects, each first instruction sheet having student learning objective information, lesson background information, and lesson material information corresponding to the instruction subject identified by the color of the first instruction sheet;
    a plurality of second instruction sheets, each second instruction sheet being laminated and comprising a colored sheet of paper, the color of each second instruction sheet corresponding to one of the instruction subjects, each second instruction sheet having the student learning objective information and lesson activity information corresponding to the instruction subject identified by the color of the second instruction sheet; and
    at least one resource sheet, each resource sheet being laminated and comprising a colored sheet of paper, the color of each resource sheet corresponding to one of the instruction subjects, each resource sheet having lesson information corresponding to the instruction subject identified by the color of the resource sheet, the resource sheets being larger than the first and second instruction sheets;
wherein at least one instruction set comprises one first instruction sheet, one second instruction sheet, and at least one resource sheet.

\* \* \* \* \*